(12) United States Patent
Wilson et al.

(10) Patent No.: US 6,346,818 B2
(45) Date of Patent: Feb. 12, 2002

(54) CAPACITANCE POSITION TRANSDUCER

(75) Inventors: Edward Wilson, Great Harwood; Colin Moore, Kirkham, both of (GB)

(73) Assignee: British Aerospace Plc, Farnborough (GB)

( * ) Notice: Subject to any disclaimer, the term of this patent is extended or adjusted under 35 U.S.C. 154(b) by 0 days.

(21) Appl. No.: 09/457,670

(22) Filed: Dec. 9, 1999

Related U.S. Application Data (63) Continuation of application No. PCT/GB99/02390, filed on Jul. 22, 1999.

(30) Foreign Application Priority Data

Jul. 22, 1998 (GB) ................................................ 9815826

(51) Int. Cl.⁷ .............................................. G01R 27/26
(52) U.S. Cl. ...................... 324/658; 324/660; 324/661
(58) Field of Search ................................. 324/658, 660, 324/661, 662, 683, 686, 690

(56) References Cited

U.S. PATENT DOCUMENTS

| | | | |
|---|---|---|---|
| 3,348,133 A | * 10/1967 | Wolfendale | 324/660 |
| 3,784,897 A | * 1/1974 | Norrie | 324/660 X |
| 3,845,377 A | 10/1974 | Shimotori | |
| 3,860,918 A | * 1/1975 | Cencel | 324/660 |
| 4,238,781 A | 12/1980 | Vercellotti et al. | |
| 4,434,391 A | 2/1984 | Swartz et al. | |
| 5,077,635 A | * 12/1991 | Bollhagen et al. | 324/735 X |
| 5,304,937 A | * 4/1994 | Meyer | 324/686 |
| 5,461,319 A | * 10/1995 | Peters | 324/660 |
| 5,977,781 A | * 11/1999 | Jordil | 324/658 |
| 6,031,380 A | * 2/2000 | Gleixner et al. | 324/683 |
| 6,118,283 A | * 9/2000 | Cripe | 324/660 |

FOREIGN PATENT DOCUMENTS

| | | |
|---|---|---|
| DE | 28 30 432 | 2/1980 |
| EP | 0 435 429 A1 | 7/1991 |
| EP | 0 525 830 A1 | 2/1993 |
| GB | 1 312 241 | 4/1973 |
| GB | 1 398 437 | 6/1975 |
| GB | 2 016 149 A | 9/1979 |
| GB | 2 020 815 A | 11/1979 |
| GB | 2 032 116 A | 4/1980 |
| GB | 2 155 638 A | 9/1985 |
| WO | 96/21159 | 7/1996 |

* cited by examiner

Primary Examiner—Safet Metjahic
Assistant Examiner—T. R. Sundaram
(74) Attorney, Agent, or Firm—Pillsbury Winthrop LLP (57) ABSTRACT

A non-contacting capacitive position transducer comprises a stator substrate carrying two electrically conducting inverted wedge regions 14,16 whose width varies inversely in a sensing direction. A moveable pick-off 20 is capacitively coupled to both wedges. The wedges 14,16 are driven with respective distinguishable time varying periodic waveforms, e.g. a sine wave and a cosine wave, and the pick-off voltage at 20 processed to determine the position of the pick-off in the sensing direction. Various configurations of transducer are described, including those of linear, cylindrical and disc form. The pick-off voltage is preferably transferred from the pick-off 20 back to the stator by capacitively coupling the pick-off to a suitably screened pick-off track 36 on the stator.

30 Claims, 4 Drawing Sheets

CAPACITANCE POSITION TRANSDUCER

This is a Continuation of: International Application No. PCT/GB99/02390 filed Jul. 22, 1999.

BACKGROUND OF THE INVENTION

This invention relates to capacitive position transducers and associated methods for position detection. The invention is particulary concerned with linear and rotary position transducers but is not limited to such transducers.

There is frequently a requirement in modern control systems for a positional transducer which provides a high resolution, absolute output, that is one in which the output indication is a unique expression of position. In applications where the accuracy requirements do not preclude their use, e.g. positional servo systems, potentiometers have traditionally been used, providing a readily available, cost effective solution where applicable.

However potentiometers do have several shortcomings. There is an inherent wear-out mechanism between the wiper and the resistive element which will ultimately result in failure of the device. They are prone to creating wiper noise, particularly under high rates of movement, and noise performance tends to deteriorate with life; this is a particular problem in high gain servo systems where the noise can interfere with correct system operation. Frequently the need is to monitor a linear motion and, whilst some linear travel potentiometers are available, these are almost invariably commercial parts unsuitable for anything other than consumer type applications. The application of a rotary potentiometer to such a requirement would therefore necessitate some kind of motional translation—a rack and pinion for example.

There is therefore a need for a potentiometer which obviates at least some of the above shortcomings. We have therefore designed a new form of transducer which does not require electrical physical contact between the mover and the stator and which provides an absolute output with high resolution, with an accuracy at least comparable with that of conventional servo-grade potentiometers.

BRIEF SUMMARY OF THE INVENTION

Accordingly, in one aspect, this invention provides a capacitive position transducer comprising:

a relatively fixed substrate including two spaced electrically conductive regions;

a mover element comprising a common electrical pick-off means capacitively coupled to both of said electrically conductive regions and mounted for movement relative to said substrate in a sensing direction, the transverse extent of at least one of said electrically conductive regions varying with the position of said mover element in the sensing direction, drive means for supplying respective different periodic time varying voltages to said electrically conductive regions, and processing means for processing the electrical signal received by said pick-off means to determine the position of said mover element, wherein said drive means applies respective different sinusoidal voltages to said electrically conductive regions, said sinusoidal voltages having a relative phase difference.

Preferably, the processing means determines at least one of the phase and magnitude of the electrical signal received by the pick-off means, to determine the relative position of the mover element.

In another aspect, this invention provides a capacitive position transducer comprising:

a relatively fixed substrate including two spaced electrically conductive regions;

a mover element comprising a common electrical pick-off means capacitively coupled to both of said electrically conductive regions, and mounted for movement in a sensing direction, the electrically conductive regions being arranged such that at least one of the respective capacitances between said pick-off means and the electrically conductive regions varies with the position of said mover element in said sensing direction, and drive means for applying respective voltages to each of said electrically conductive regions, and position determining means for monitoring the position of said mover element relative to said substrate, wherein said drive means supplies respective different sinusoidal voltages to said electrically conductive regions, said sinusoidal voltages having a relative phase difference.

In yet another aspect, this invention provides a method of position detection which comprises providing a relatively fixed substrate including two spaced electrically conducting regions and a pick-off means capacitively coupled to both of said regions, said pick-off being connected to a mover element for movement in a sensing direction, at least one of the respective capacitances between the pick-off and the electrically conductive regions varying with position in said sensing direction, the method further comprising monitoring at least one of said capacitances thereby to determine the position of said mover element, and applying respective different sinusoidal voltages to said electrically conductive regions, said sinusoidal voltages having a relative phase difference.

Preferably, both of said electrically conducting regions vary in transverse extent in said sensing direction whereby the capacitance between each electrically conductive region and the pick-off means varies in said sensing direction.

Preferably, said electrically conductive regions vary linearly and inversely in transverse extent in said sensing direction. Thus, in one arrangement the electrically conductive regions may be arranged as two triangles in inverted relationship together defining a generally rectangular plan shape.

Alternatively, the electrically conductive regions may each vary in said sensing direction with a profile selected in accordance with the drive voltages to said electrically conducting regions, at least partially to compensate for nonlinearities in the output signal.

The pick-off means may be connected directly to said processing means e.g. via an electrically conducting wire or the like. Alternatively, to avoid the need to provide a moveable electrically conducting element such as a wire or track, the pick-off means may be capacitively coupled to a track means which extends alongside the path of movement of said mover element, with suitable screening, so that the output signal may be taken from the track means.

The substrate may take any of a number of different forms. For example, the substrate may be generally flat or planar. Here the mover element may be mounted for linear movement in a straight line relative to said substrate, analogous to a conventional linear potentiometer. Alternatively, said mover element may be mounted for rotary movement about a rotary axis and the substrate may be of generally disc or annular form. In this instance the transducer is akin to a rotary potentiometer.

Alternatively, said substrate may comprise a cylindrical or part-cylindrical surface and said mover element may be disposed adjacent said cylindrical a part-cylindrical surface and mounted for movement about an axis generally coaxial with the principal axis of said cylindrical or part cylindrical surface.

The drive means may apply various forms of drive voltages to the electrically conductive regions such that the combined signal at the electrical pick-off means may be processed to determine the position of the mover element. Thus the drive means may apply respective different sinusoidal voltages. The sinusoidal voltages are preferably of substantially equal amplitude. Conveniently, said sinusoidal voltages have a relative phase difference of 90°, effectively to provide respective sin and cosine waveforms. However other phase differences may also be used.

The processing means preferably determines at least one of the relative phase and magnitude of the electrical signal received by said pick-off means, to determine the position of said mover element relative to a fixed datum position.

Where the electrically conductive regions vary linearly and inversely in axial extent in said sensing direction, the drive means may apply respective sinusoidal waveforms of the form $V \cdot \sin(\omega t)$ and $V \cdot \cos(\omega t)$ and the relative position of the mover element may be determined from the signal $V_o$ at said pick-off, wherein $V_o = K \cdot V \cdot \sin(\omega t \theta);$ $\theta = \arctan(\alpha/1-\alpha);$ $K = \sqrt{(\alpha^2 + (1-\alpha)^2)}$ and $\alpha$ is the distance of the mover element from the highest capacitance part of the electrically conducting region driven by said $V \cdot \sin(\omega t)$ waveform expressed as a proportion of the maximum range of sensing movement of said mover element.

It will be noted that $\alpha$ and $\theta$ vary non-linearly; this may be overcome by modifying the profiles of the electrically conductive regions to reduce or remove the non-linearity so that the phase difference ($\theta$) varies linearly with the position ($\alpha$) of the mover element.

Alternatively, the non linearity may be overcome by signal processing. Thus said processing means may be operable to multiply said output voltage $V_o$ at said pick-off means with a D.C.-nulling periodic time varying voltage at the same frequency as said output voltage, and adjusting the relative phase of said D.C.-nulling periodic time varying voltage to null the D.C. term of said product, and thereby determine the position of said mover element relative to a fixed datum.

Preferably said D.C.-nulling periodic voltage is generated by multiplying the drive voltages applied to said electrically conducting regions. Thus said processing means may include generating means for producing said D.C.-nulling periodic voltage, said generating means including means for multiplying the time varying voltages ($V \cdot \sin(\omega t)$; $V \cdot \cos(\omega t)$) supplied to said electrically conductive regions with respective inversely related voltages, ($V_{ref} - V_{con}$) and ($V_{con}$), means for summing the product of said multiplying means and phase shifting the sum to obtain said D.C.-nulling periodic voltage.

Preferably said processing means includes integrator means for receiving the product of said pick-off output voltage $V_o$ with the D.C.-nulling voltage $V'_o$, and adjusting said inversely related voltages, ($V_{ref} - V_{con}$) and ($V_{con}$) to null said D.C. term.

In yet another aspect, there is provided a capacitive position transducer comprising:

a relatively fixed substrate including two spaced electrically conductive regions varying lineally and inversely in transverse extent;

a mover element comprising a common electrical pick-off means capacitively coupled to both of said electrically conductive regions and mounted for movement relative to said substrate in a sensing direction, the transverse extent of at least one of said electrically conductive regions varying with the position of said mover element in the sensing direction, drive means for supplying respective different periodic time varying voltages to said electrical conductive regions, and processing means operable to multiply an output voltage at said pick-off means with a DC nulling periodic voltage at the same frequency as said output voltage and to adjust the relative phases of said DC nulling periodic time varying voltage to null the DC term of said product, and thereby to determine the relative position of said mover element.

Whilst the invention has been described above, it extends to any inventive combination of the features set out above or in the following description.

BRIEF DESCRIPTION OF THE SEVERAL VIEWS OF THE DRAWINGS

The invention may be performed in various ways and, by way of example only a specific embodiment and various modifications thereof now will be described in detail, reference being made to the accompanying drawings in which:-

DETAILED DESCRIPTION OF THE INVENTION

Figure 1:
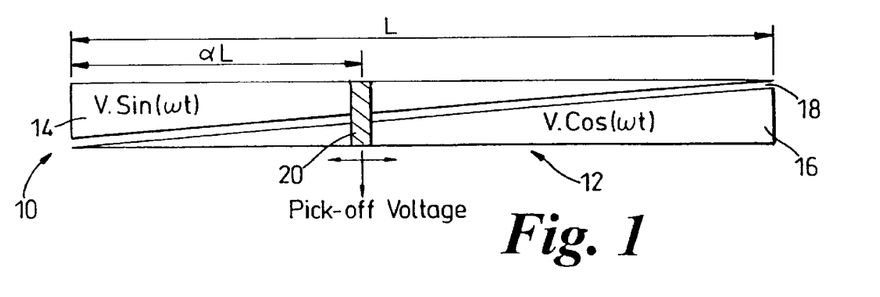
FIG. 1 is a schematic plan view of a transducer in accordance with the invention.

Referring initially to FIG. 1, a first embodiment of position transducer 10 comprises a stator substrate 12 of flat planar form on which are deposited two triangular sections or tracks 14, 16 of copper, spaced by an insulating gap 18. A mover element carrying a pick-off 20 extends across the width of the substrate and is spaced above the surface thereof by a small air gap such that the pick-off is capacitively coupled to both the triangular sections 14 and 16. The two triangular sections of copper 14, 16 are driven with alternating voltage waveforms, one (14) with $V \cdot \mathrm{Sin}(\omega t)$ and the other (16) with $V \cdot \mathrm{Cos}(\omega t)$.

Figure 2:
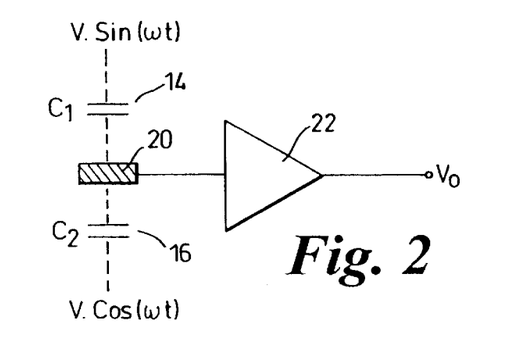
FIG. 2 shows an equivalent electrical circuit of the embodiment of FIG. 1 and its output circuit.

Referring to FIG. 2, the output from the pick-off 20 is fed to a high input impedance voltage buffer 22. The values of $C_1$ and $C_2$ are proportional to the areas of the tracks 14, 16 under the pick-off 20, so that with the pick-off at either end, one capacitor will be maximised whilst the other is reduced to zero. Thus at the Sin end, $$C_1 = C_{max},\ C_2 = 0,\ \text{and}\ V_o = V \cdot \mathrm{Sin}(\omega t)$$

and at the Cos end, $$C_1 = 0,\ C_2 = C_{max},\ \text{and}\ V_o = V \cdot \mathrm{Cos}(\omega t)$$

At some point in between the output voltage, $V_o$, is given by:

$$V_o = V \cdot \mathrm{Sin}(\omega t)/(1 + C_1/C_2) + V \cdot \mathrm{Cos}(\omega t)/(1 + C_2/C_1)$$

Now $C_1 = C_{max} \cdot (1-\alpha)$ and $C_2 = C_{max} \cdot \alpha$, (where $\alpha$ is the ratio of the pick-off's distance from the sin end divided by the overall length of the tracks (14, 16), and substituting for $C_1$ and $C_2$ gives:

$$V_o = V \cdot \mathrm{Sin}(\omega t) \cdot (1-\alpha) + V \cdot \mathrm{Cos}(\omega t) \cdot \alpha \quad \text{(Equation 1)}$$

$$V_o = K \cdot V \cdot \mathrm{Sin}(\omega t + \theta) \quad \text{(Equation 2)}$$

where $$\theta = \arctan(\alpha/(1-\alpha)) \quad \text{(Equation 3)}$$

$$K = \sqrt{(\alpha^2 + (1-\alpha)^2)} \quad \text{(Equation 4)}$$

It can be seen from Equations 2, 3, and 4 that the output voltage, $V_o$, will be a Sin wave of varying phase and amplitude. At the mid point, ($\alpha = 0.5$), $V_o$ will be $1/\sqrt{2}$ of the value at either end, and $\theta$ will be 45°. Between the mid point and either end however the relationship between $\theta$ and $\alpha$ becomes nonlinear. Thus, at a quarter distance from the Sin end, ($\alpha = 0.25$), $\theta = \arctan(1/3) = 18.435°$, and not 22.5° as would be the case were the relationship linear.

This non-linearity may be removed by modifying the profile of the facing edges of tracks 14 and 16 but we describe below an alternative approach which multiplies the output voltage, $V_o$ by a cosine term at the same frequency to obtain a D.C. term. Thus:

$$2 \cdot \mathrm{Sin}(A) \cdot \mathrm{Cos}(B) = \mathrm{Sin}(A+B) + \mathrm{Sin}(A-B),$$

substituting $$A = (\omega t + \theta)\ \text{and}\ B = (\omega t + \phi),$$

the following expression results:

$$2 \cdot \mathrm{Sin}(\omega t + \theta) \cdot \mathrm{Cos}(\omega t + \phi) = \mathrm{Sin}(2\omega t + \theta + \phi) + \mathrm{Sin}(\theta - \phi) \quad \text{(Equation 5)}$$

$\mathrm{Sin}(2\omega t + \theta + \phi)$ is an alternating term at twice the modulation frequency ($2\omega t$) and can be removed with a low-pass filter. The remaining term $\mathrm{Sin}(\theta - \phi)$ is a D.C. term which becomes zero when $\theta = \phi$.

Therefore, if we multiply the $\mathrm{Sin}(\omega t + \theta)$ term from the output voltage of Equation (2) by $\mathrm{Cos}(\omega t + \phi)$ and adjust the result for zero D.C., then $\theta = \phi$. Knowing this, a value for $\phi$ can be obtained so that $\theta$ can be determined; $\alpha$(the proportional distance of the slider along the track) is determined from Equation (3), to give a read out of the position of the slider.

Figure 3:
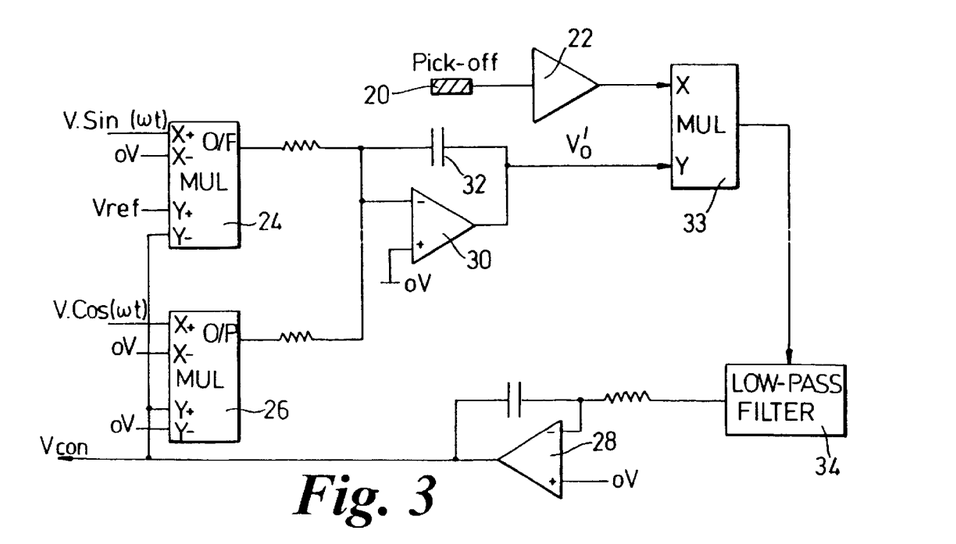
FIG. 3 is a diagram of an electrical circuit for processing the output received by the pick-off to provide an output signal which varies substantially linearly with the position of the mover element.
Figure 4:
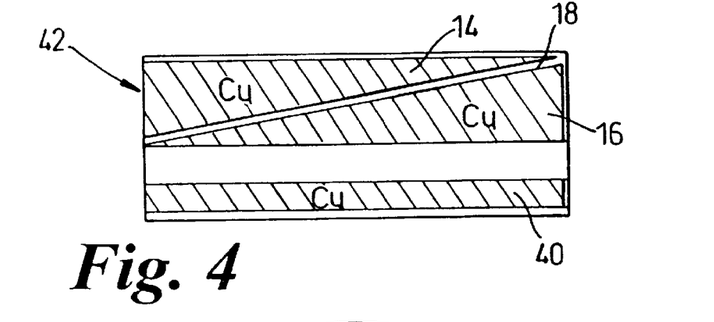
FIG. 4 is a plan view of a substrate for a further embodiment of non-contacting capacitive transducer of this invention.

Referring to FIG. 3, the terms $\mathrm{Cos}(\omega t + \phi)$ may be derived as follows:

Two multipliers 24, 26 are used to multiply the $V \cdot \mathrm{Sin}(\omega t)$ and $V \cdot \mathrm{Cos}(\omega t)$ waveforms by $(V_{ref} - V_{con})$ and $(V_{con})$ respectively, where $V_{ref}$ is a reference voltage and $V_{con}$ is a control voltage derived from the output of an integrator 28 with the range $0 \to V_{ref}$. The outputs of the multipliers 24, 26, are added in a summing amplifier 30 and the output is phase-shifted by a feedback capacitor 32.

Were it not for the phase shift, the output of the summing amplifier 20 would be of the form:

$$V_o' = K' \cdot ((V_{ref} - V_{con}) \cdot V \cdot \mathrm{Sin}(\omega t)) + (V_{con} \cdot V \cdot \mathrm{Cos}(\omega t))$$

Where K' is the gain through the summing amplifier. This reduces to $$V_o' = K'' \cdot (V \cdot \mathrm{Sin}(\omega t) \cdot (1 - \beta) + \mathrm{Cos}(\omega t) \cdot \beta) \quad \text{(Equation 6)}$$

where $$\beta = V_{con}/V_{ref}\ \text{and}\ K'' = K' \cdot V_{ref}$$

The similarity to Equation (1) will be noted. This in turn reduces to $$V_o' = K''' \cdot V \cdot \mathrm{Sin}(\omega t + \phi) \quad \text{(Equation 7)}$$

where $$\phi = \arctan(\beta/(1-\beta)) \quad \text{(Equation 8)}$$

$$K''' = K'' \cdot \sqrt{(\beta^2 + (1-\beta)^2)}$$

By introducing the 90° phase shift in the summing amplifier Equation (7) becomes:

$$V_o = K''' \cdot V \cdot \mathrm{Cos}(\omega t + \phi) \quad \text{(Equation 9)}$$

which is the required term for Equation (5).

A third multiplier 33 takes these two terms and multiplies them to generate the terms to the right of the equality in Equation (5) and the output of this multiplier consists of an A.C. term at $2 \cdot \omega$ plus a D.C. term. The alternating component is removed by a low-pass filter 34 and the integrator 28 adjusts $V_{con}$ until the D.C. term becomes zero.

Because the forms of Equations (1) and (6) are the same, the non-linearity that exists in the relationship between $\alpha$ and $\theta$ is exactly cancelled by the same relationship between $\beta$ and $\phi$ and $\beta$ is therefore linearly related to $\alpha$.

Furthermore, since it is $\beta$ and not $V_{con}$ which is important, $V_{con}$ will be scaled by $V_{ref}$, thereby giving an output which is potentiometric in nature. Throughout the circuit actual signal values are unimportant, so long as signal levels are sufficient to maintain adequate signal to noise, and it is purely the relative phases of the signal which matters.

Furthermore it can be shown that, as opposed to excitation waveforms of $\mathrm{Sin}(\omega t)$ and $\mathrm{Cos}(\omega t)$, (which is actually the same as $\mathrm{Sin}(\omega t + 90°)$), $\mathrm{Sin}(\omega t)$ and $\mathrm{Sin}(\omega t + \epsilon)$ could be used, where $\epsilon$ is some phase angle other than 90°, with no change in performance other than, in the limit, a degradation of signal to noise. ($\epsilon$ tending to zero for example).

This means that the circuit will be tolerant of variations in the phase/frequency of the drive waveforms and variations of pick-off voltage due to discrepancies in the size of the air gap. Likewise, so long as the relative amplitudes of the two drive waveforms remain constant, the actual levels are not important.

Figure 10:
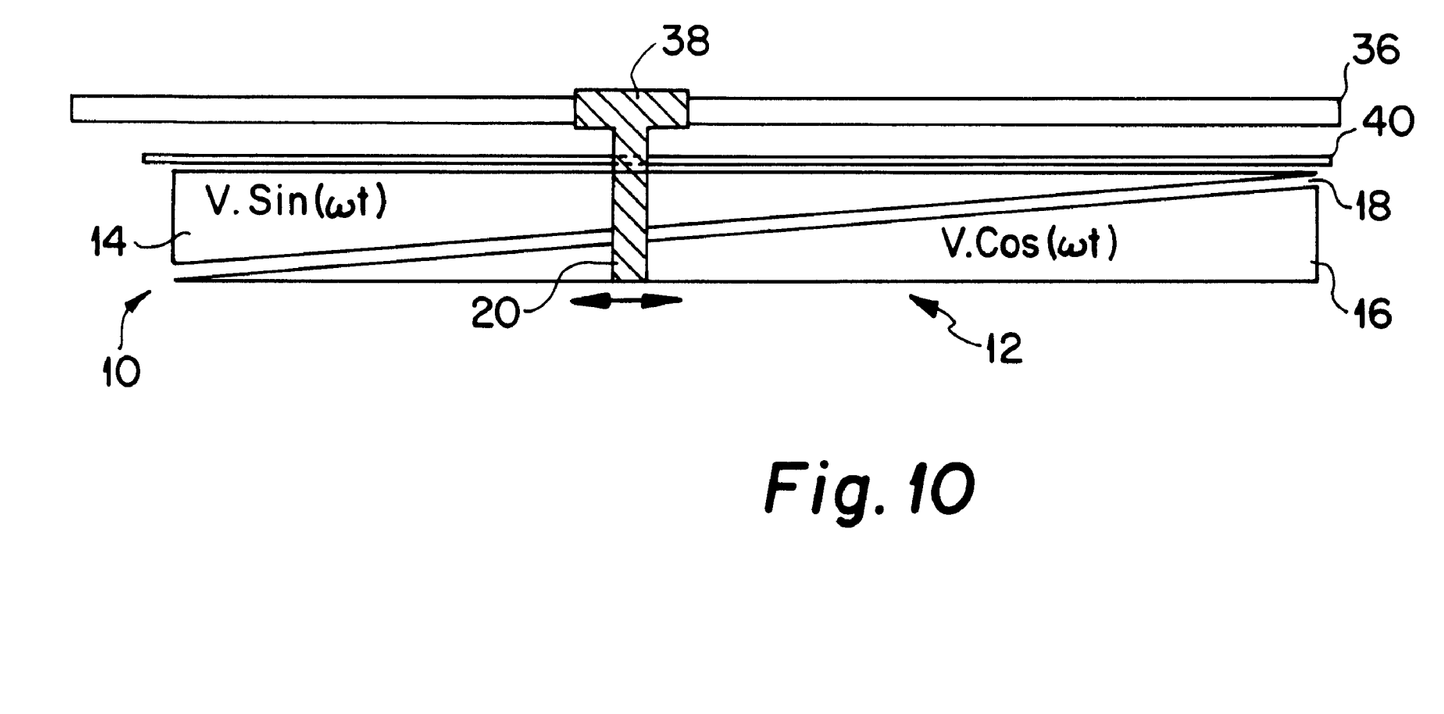
FIG. 10 is a plan view similar to that of FIG. 1 except with a modified arrangement for transferring the signal from the pick off to a stationary terminal.

In the embodiment described above with reference to FIGS. 1, 2, and 3, the voltage from the pick-off 20 is passed by a trailing wire to the voltage buffer amplifier 22. In particular applications this may not be desirable and so in an alternative arrangement shown in FIG. 10, a third track or rail 36 is provided alongside the substrate 12 and the pick-off 20 is extended at 38 so that it is capacitively coupled to the track 36, thus allowing the signal to be picked off from a static position. To prevent the track 36 "seeing" the signal on the adjacent track section 14, suitable screening is provided including the provision of an electrical barrier 40 between the track 36 and the track 14.

As a further modification, instead of being flat planar, the copper tracks, 14, 16 can be made circular, either in the form of a cylinder or a disc, of proportions suitable for embodiment in a traditional potentiometer housing. It should be noted that the tracks need not be separated by a straight diagonal gap but instead the gap may be of sinusoidal form, so that the output voltage from the buffer amplifier 22 is linearly related to the position of the pick-off. In this instance, the position is determined by observing the value of $V_{con}$ relative to $V_{ref}$ in a similar way in which the position indicated in a conventional contacting potentiometer is measured by the wiper voltage relative to the voltage across the whole of the track.

It should also be appreciated that several similar transducers may be stacked together one above the other with a common actuator, e.g. a common axle or rotor shaft to which an appropriate number of pick-off rotors are attached.

In each of these embodiments, the excitation voltage for the potentiometer would be used to power the electronics, incorporated inside a housing in the form of a lowpower analogue ASIC (application specific integrated circuit), and the output would be a D.C. voltage which behaved exactly like a wiper voltage, ranging from zero to reference voltage, but without the attendant potentiometer problems outlined at the start.

Alternatively, a 5-terminal approach could be adopted whereby two additional terminals provide power to the electronics whilst the other three terminals simulate a potentiometer, two of the three being used for the potentiometer reference and the third being the wiper output voltage.

Whilst in the above embodiment the drive waveforms have been sine waves, tests have shown that triangular waveforms give results comparable to those using sine waves. Also waveforms which are not pure sine waves, i.e. those containing some harmonic content or distortion do not within quite wide limits, appear to make any significant difference to the results obtained, provided they contain incremental phase information, from which a position dependent phase difference may be obtained.

Figure 5:
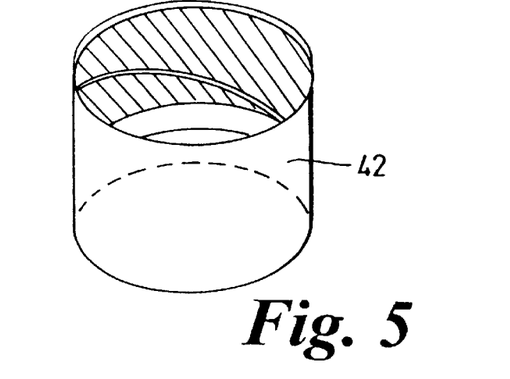
FIG. 5 shows the substrate of FIG. 4 wrapped around to form a cylinder.

Referring now to FIGS. 4 to 7, a further embodiment of non-contacting capacitative transducer will now be described. In this embodiment, a pattern of copper tracks making up the wedges 14,16 and the pick-off strip 40 are provided on a thin, flexible, insulating substrate 42, for example by etching, plating, deposition, or other suitable accurate photographic method or the like. The substrate 42 is then folded round to form a cylinder as shown in FIG. 5. A centre shaft 44 carrying a first wedge pick-off 46 and a second cylindrical pick-off 48 electrically connected thereto, is mounted coaxially within the cylinder for rotation about the cylindrical or sensing axis. As seen more clearly in FIGS. 6 and 7, the wedge pick-off 46 is of axial length equivalent to the maximum width of each wedge 14,16. The cylindrical pick-off 48 is capacitively coupled to the pick-off strip 40.

Figure 6:
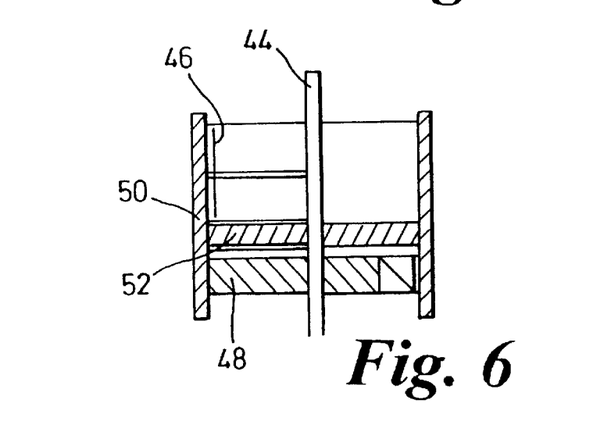
FIG. 6 is a cross-sectional view through the further embodiment showing the substrate of FIGS. 4 and 5, and a mover element.
Figure 7:
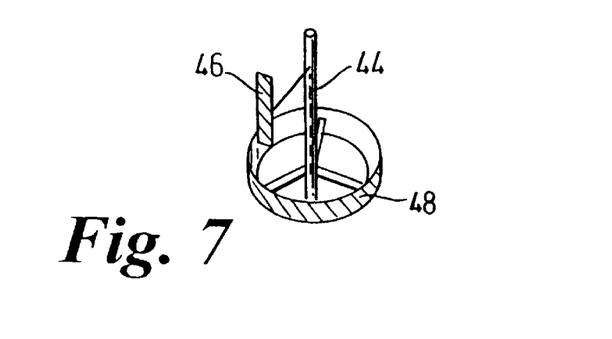
FIG. 7 is a detailed view of the mover element.

The substrate 42 is housed within a metal cylindrical housing 50 which includes a disc-shaped screen 52 which screens the upper and lower sections of the substrate. The electric connections to the wedges 14, 16 and the pick-off strip 40 are made through the housing walls, with suitable layers of screening to prevent coupling between the wedges and the pick-off strip 40.

Figure 8:
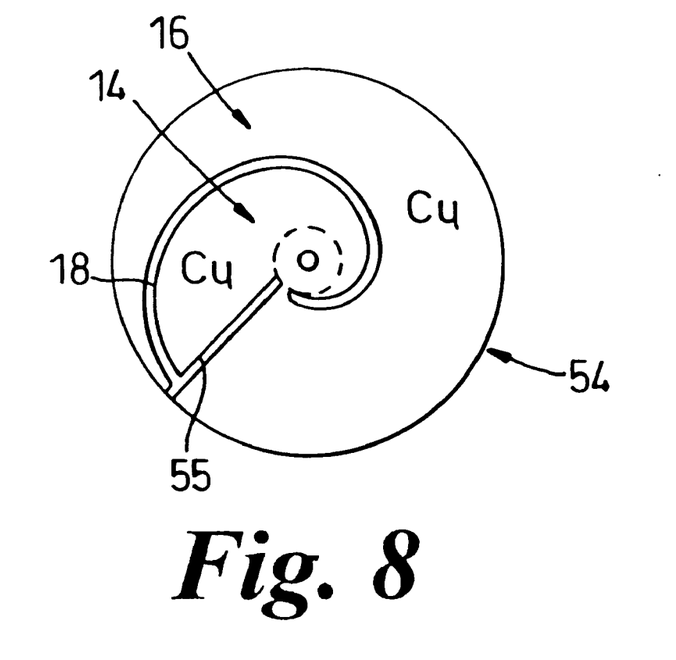
FIG. 8 is a plan view of a substrate for another embodiment of capacitive transducer having a spiral arrangement of electrically conducting regions.
Figure 9:
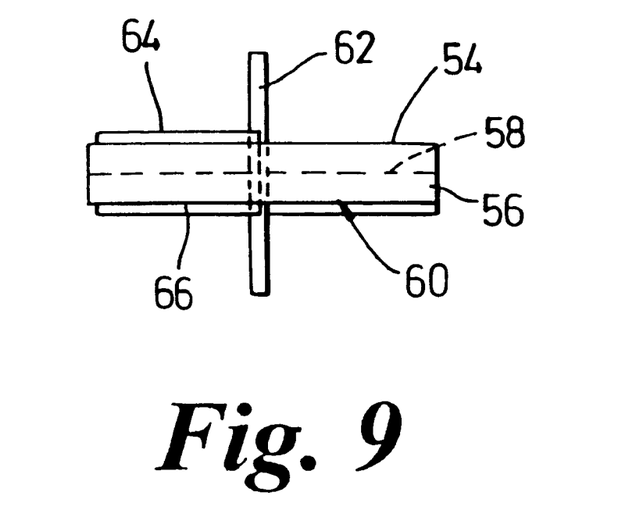
FIG. 9 is a side view of an arrangement including spaced upper and lower substrates of the form shown in FIG. 8.

Referring now to FIGS. 8 and 9, in this embodiment 10 the wedges 14 and 16 are formed on a first substrate disc 54 with the gap 18 therebetween describing a spiral, and a radial insulating gap 55.

The first substrate disc 54 is mounted on one side of a support disc 56 which includes a metallic screen element 58 in its mid region. The lower surface of the support disc 56 carries a second substrate 60 which is a plane pick-off disc. A pick-off shaft 52 is coaxially mounted with respect to the support disc 56 and carries a radially extending phase pick-off 64 and a coupling disc 66 electrically connected to the pick- off 64 through the shaft 62.

Electrical connections are made to the wedges 16, 18 and the pick-off substrate 60 via the support disc 56. As previously, the rotary position of the shaft 62 determines the proportions of the widths of the wedges 16 and 18 capacitively coupled to the phase pick-off 64. The wedges 16 and 18 are driven by respective sinusoidal voltages or other suitable periodic time-varying waveforms, and the resultant voltage picked up by the pick-off 64 processed to determine the angular position of the shaft.

What is claimed is:

1. A capacitive position transducer comprising:
    a relatively fixed substrate including first and second spaced electrically conductive regions;
    a mover element comprising a common electrical pick-off capacitively coupled to both of said electrically conductive regions and mounted for movement relative to said substrate in a sensing direction,
    the transverse extent of each of said electrically conductive regions varying oppositely with the position of said mover element in the sensing direction;
    a drive circuit for supplying respective different first and second sinusoidal drive voltages (Sin(ωt)) and (Sin(ωt+ ε)) at substantially the same frequency but at different phases which are other than 0° or ±180° to said electrically conductive regions, and
    a processor for processing the electrical signal (Sin(ωt+ θ)) received by said pick-off to determine the position of said mover element,
    wherein said processor is programmed to:
        (i) multiply the electrical signal (Sin(ωt+θ)) from said pick-off with a sinusoidal multiplier signal (Cos(ωt+ φ)) at substantially the same frequency as said drive voltages to provide a signal (0.5 Sin(2ωt+θ+φ))+Sin (θ−φ)) having a D.C. component (Sin(θ−φ)),
        (ii) adjust the relative phase (φ) of said multiplier signal relative to the signal from said pick-off substantially to null said D.C. component (Sin(θ−φ)), and
        (iii) thereby determine the relative position of said pick-off.

2. A capacitive position transducer according to claim 1 wherein both of said electrically conductive regions vary in transverse extent in said sensing direction.

3. A capacitive position transducer according to claim 2, wherein said electrically conductive regions vary linearly and oppositely in transverse extent in said sensing direction.

4. A capacitive position transducer according to claim 2, wherein said electrically conductive regions each vary with a profile selected in accordance with the associated sinusoidal drive voltage at least partially to compensate for non-linearities in the signal processed by said processor.

5. A capacitive position transducer according to claim 1, wherein said pick-off is connected directly to said processor.

6. A capacitive position transducer according to claim 1, wherein said pick-off is capacitively coupled to a rail or track extending adjacent the path of movement of said mover element.

7. A capacitive position transducer according to claim 1 wherein said substrate is of generally flat planar form.

8. A capacitive position transducer according to claim 1, wherein said mover element is mounted for linear movement in a straight line relative to said substrate.

9. A capacitive position transducer according to claim 1, wherein said mover element is mounted for rotary movement about a rotary axis.

10. A capacitive position transducer according to claim 1, wherein said electrically conductive regions are disposed side by side on one face of said substrate together to define a shape of generally constant combined width in the direction transverse to the sensing direction.

11. A capacitive position transducer according to claim 1, wherein said substrate comprises a cylindrical or part cylindrical surface and said mover element is disposed adjacent said cylindrical or part-cylindrical surface and mounted for movement about an axis generally co-axial with the principal axis of said cylindrical or part-cylindrical surface.

12. A capacitive position transducer according to claim 1, wherein said sinusoidal voltages are of substantially equal amplitude.

13. A capacitive position transducer according to claim 12, wherein said sinusoidal voltages have a relative phase difference of 90°, to provide respective sine and cosine drive waveforms.

14. A capacitive position transducer according to claim 12, wherein said drive applies to the electrically conductive regions respective sinusoidal waveforms of the form V·Sin($\omega$t) and V·Cos($\omega$t), and the relative position of the mover element is determined from the signal $V_o$ at said pick-off, wherein $V_o = K \cdot V \cdot \text{Sin}(\omega t + \theta)$;

$\theta = \arctan(\alpha/1 - \alpha)$;

$K = \sqrt{(\alpha^2 + (1-\alpha)^2)}$ and $\alpha$ is the distance of the mover element from the highest capacitance part of the electrically conducting region driven by said V·Sin($\omega$t) waveform expressed as a proportion of the maximum range of sensing movement of said mover element.

15. A capacitive position transducer according to claim 1, wherein said processor includes a generator for producing said multiplier signal, said generator including a multiplier for multiplying the time varying voltages (V·Sin($\omega$t); V·Sin($\omega$t+$\epsilon$)) supplied to said electrically conductive regions with respective inversely related voltages (($V_{ref}$-$V_{con}$) and $V_{con}$), an adder for summing the products of said multiplier and a phase-shifter for phase-shifting the sum to obtain said multiplier signal.

16. A capacitive position transducer according to claim 15, wherein said processor includes an integrator for receiving the product of said pick-off output voltage $V_o$ with said multiplier signal, and adjusting said inversely related voltages (($V_{ref}$-$V_{con}$) and $V_{con}$) to null said D.C. term.

17. A method of position detection which comprises providing a relatively fixed substrate including two spaced electrically conducting regions and a pick-off means capacitively coupled to both of said regions, said pick-off means being connected to a mover element for movement in a sensing direction, at least one of respective capacitances between the pick-off and the electrically conductive regions varying with position in said sensing direction, the method further comprising applying respective different sinusoidal voltages (Sin($\omega$t)); (Sin($\omega$t+$\epsilon$)) to said electrically conductive regions, said sinusoidal voltages having a relative phase difference which is other than 0° or ±180°, multiplying the electrical signal received by the pick-off (Sin($\omega$t+$\theta$)) with a sinusoidal multiplier (Cos($\omega$t+$\phi$)) at substantially the same frequency as said drive voltages, to obtain a signal having a D.C. component (Sin($\theta$-$\phi$)), adjusting the relative phase of said multiplier signal relative to said pick-off substantially to null said D.C. component and thereby determine the displacement of said pick-off.

18. A capacitive position transducer comprising:
a relatively fixed substrate including two spaced electrically conductive regions varying linearly and oppositely in transverse extent;
a mover element comprising a common electrical pick-off capacitively coupled to both of said electrically conductive regions and mounted for movement relative to said substrate in a sensing direction;
a drive circuit for supplying respective different periodic time varying voltages to said electrical conductive regions, and
a processor operable to multiply an output voltage at said pick-off with a multiplier signal at the same frequency as said output voltage and to adjust the relative phases of said multiplier signal to null the D.C. term of said product, and thereby to determine the relative position of said mover element.

19. A capacitive position transducer according to claim 18, wherein said drive circuit applies to the electrically conductive regions respective sinusoidal waveforms of the form V·Sin($\omega$t) and V·Cos($\omega$t), and the relative position of the mover element is determined from the signal $V_o$ at said pick-off wherein $V_o = K \cdot V \cdot \text{Sin}(\omega t + \theta)$;

$\theta = \arctan(\alpha/1 - \alpha)$;

$K = \sqrt{(\alpha^2 + (1-\alpha)^2)}$ and $\alpha$ is the distance of the mover element from the highest capacitance part of the electrically conducting region driven by said V·Sin($\omega$t) waveform expressed as a proportion of the maximum range of sensing movement of said mover element.

20. A capacitive transducer according to claim 19, wherein said processor includes a circuit for producing said multiplier signal, said circuit including a multiplier for multiplying the time varying voltages (V·Sin($\omega$t); V·Cos ($\omega$t)) supplied to said electrically conductive regions with respective inversely related voltages (($V_{ref}$-$V_{con}$) and $V_{con}$), an adder for summing the products of said multiplier, and a phase-shifter for phase-shifting the sum to obtain said multiplier signal.

21. A capacitive transducer according to claim 18, wherein said processor includes an integrator for receiving the product of said pick-off output voltage $V_o$ with the D.C.-nulling voltage, and adjusting said inversely related voltages (($V_{ref}$-$V_{con}$) and $V_{con}$) to null said D.C. term.

22. A capacitive position transducer according to claim 1, wherein said first and second drive voltages have different amplitudes.

23. A capacitive position transducer according to claim 1, wherein said processor includes:
  a first multiplier for multiplying said first sinusoidal drive voltage by a first variable value;
  a second multiplier for multiplying said second sinusoidal signal by a second variable value which varies inversey with said first variable value;
  an adder for adding the respective products from said first and second multipliers, and
  a phase shifter for applying a phase shift of substantially 90° to the sum from said adder, thereby to derive said sinusoidal multiplier signal ($Cos(\omega t+\phi)$).

24. A capacitive position transducer according to claim 23, wherein said processor includes a third multiplier to effect said multiplication of the electrical signal ($Sin(\omega t+\theta)$) from said pick-off with said multiplier signal ($Cos(\omega t+\phi)$) to obtain said signal having a D.C. component.

25. A capacitive position transducer according to claim 24, including a low pass filter and an integrator for receiving the output from said third multiplier and thereby obtaining said second variable ($V_{con}$).

26. A capacitive position transducer according to claim 25, which further includes a reference voltage source for producing a reference value ($V_{ref}$) and wherein said processor derives said first variable ($V_{ref}-V_{con}$) by operating on said reference value ($V_{ref}$) and said second variable ($V_{con}$).

27. A capacitive position transducer according to claim 26, wherein said processor is operable to adjust the value of said second variable, thereby to adjust the phase of said multiplier signal ($Cos(\omega t+\phi)$) to cause a D.C. component ($Sin(\theta-\phi)$) to be nulled, and to output said second variable ($V_{con}$) as a signal representative of the position of said pick-off.

28. A capacitive position transducer comprising:
  a relatively fixed substrate including two spaced electrically conductive regions;
  a mover element comprising a common electrical pick-off capacitively coupled to both of said electrically conductive regions and mounted for movement relative to said substrate in a sensing direction;
  the transverse extent of said electrically conductive regions varying oppositely with the position of said mover element in the sensing direction;
  a drive circuit for supplying respective different sinusoidal voltages at a relative phase difference of 90° to provide respective sine and cosine drive waveforms to said electrically conductive regions, and
  a processor for processing the electrical signal received by said pick-off to determine the position of said mover element.

29. A capacitive position transducer comprising:
  a relatively fixed substrate including two spaced electrically conductive regions;
  a mover element comprising a common electrical pick-off capacitively coupled to both said electrically conductive regions and mounted for movement relative to said substrate in a sensing direction;
  the transverse extent of said electrically conductive regions varying oppositely with the position of said mover element in the sensing direction;
  a drive circuit for applying to the electrically conductive regions respective sinusoidal waveforms of the form $V \cdot Sin(\omega t)$ and $V \cdot Cos(\omega t)$, and the relative position of the mover element is determined from the signal $V_o$ at said pick-off, wherein:

$$V_o = K \cdot V \cdot Sin(\omega t + \theta);$$

$$\theta = \arctan(\alpha/1-\alpha)$$

and $$K = \sqrt{(\alpha^2 + (1-\alpha)^2)}.$$

30. A capacitive position transducer comprising:
  a relatively fixed substrate including two spaced electrically conductive regions varying linearly and oppositely in transverse extent;
  a mover element comprising a common electrical pick-off capacitively coupled to both of said electrically conductive regions and mounted for movement relative to said substrate in a sensing direction;
  a drive circuit for supplying respective different periodic time varying voltages to said electrical conductive regions, and
  a processor operable to multiply an output voltage at said pick-off with a multiplier signal at the same frequency as said output voltage and to adjust the relative phases of said multiplier signal to null the D.C. term of said product, and thereby to determine the relative position of said mover element,
  wherein said drive means applies to the electrically conductive regions respective sinusoidal waveforms of the form $V \cdot Sin(\omega t)$ and $V \cdot Cos(\omega t)$, and the relative position of the mover element is determined from the signal $V_o$ at said pick-off wherein $$V_o = K \cdot V \cdot Sin(\omega t + \theta);$$

$$\theta = \arctan(\alpha/1-\alpha);$$

$$K = \sqrt{(\alpha^2 + (1-\alpha)^2)}$$

and α is the distance of the mover element from the highest capacitance part of the electrically conducting region driven by said $V \cdot Sin(\omega t)$ waveform expressed as a proportion of the maximum range of sensing movement of said mover element.

* * * * *